United States Patent
Hashiba et al.

(10) Patent No.: US 12,060,945 B2
(45) Date of Patent: Aug. 13, 2024

(54) FLOW RATE CONTROL VALVE

(71) Applicant: AISAN KOGYO KABUSHIKI KAISHA, Obu (JP)

(72) Inventors: Hirofumi Hashiba, Obu (JP); Shohei Komatsu, Obu (JP); Shigehito Suzuki, Toyota (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 18/023,137

(22) PCT Filed: Jun. 1, 2021

(86) PCT No.: PCT/JP2021/020811
§ 371 (c)(1),
(2) Date: Feb. 24, 2023

(87) PCT Pub. No.: WO2022/064775
PCT Pub. Date: Mar. 31, 2022

(65) Prior Publication Data
US 2023/0304583 A1    Sep. 28, 2023

(30) Foreign Application Priority Data
Sep. 23, 2020   (JP) ................. 2020-158532

(51) Int. Cl.
*F16K 1/20*    (2006.01)
*H01M 8/04089*    (2016.01)

(52) U.S. Cl.
CPC ........ *F16K 1/2057* (2013.01); *H01M 8/04089* (2013.01)

(58) Field of Classification Search
CPC ........ F16K 1/2057; F16K 1/2263; F16K 1/42; F16K 1/425; F16K 5/0271; F16K 5/0471; F16K 5/0689
See application file for complete search history.

(56) References Cited

U.S. PATENT DOCUMENTS 2,953,347 A * 9/1960 Phillips ............... F02M 1/00
                                                     251/361
2013/0026406 A1    1/2013 Kawauchi et al.

FOREIGN PATENT DOCUMENTS

GB       2226619 A * 7/1990 .......... F16K 1/2263
JP      2013-029127 A    2/2013
(Continued)

OTHER PUBLICATIONS

Machine English translation of WO2019146243 (Year: 2024).*
(Continued)

*Primary Examiner* — Hailey K. Do
(74) *Attorney, Agent, or Firm* — Oliff PLC (57) ABSTRACT

In a flow rate control valve, a valve seat includes an annular base part and an annular seal part provided on the inner periphery thereof. A body includes a contact surface with which an end of the base part in the axial direction contacts and a press-fit surface against which the outer peripheral surface of the base part is press-fitted. The seal part includes: a seat surface at an end on an opposite side to the contact surface in the axial direction to contact a valve element to seal between the valve seat and the valve element in a valve closed state; and a valve-seat-to-body sealing portion protruding toward the contact surface more than the base part at an end on the side of the contact surface in the axial direction and contacting the contact surface to seal between the valve seat and the body.

18 Claims, 7 Drawing Sheets

(56) References Cited

FOREIGN PATENT DOCUMENTS

| JP | 2019-019975 A | 2/2019 | | |
|---|---|---|---|---|
| JP | 2019-027569 A | 2/2019 | | |
| JP | 2019-029129 A | 2/2019 | | |
| JP | 2019-206995 A | 12/2019 | | |
| WO | WO-2019146243 A1 * | 8/2019 | ............ | B23K 31/02 |

OTHER PUBLICATIONS

Jul. 20, 2021 International Search Report issued in International Patent Application No. PCT/JP2021/020811.

Mar. 28, 2023 International Preliminary Report on Patentability issued in International Patent Application No. PCT/JP2021/020811.

* cited by examiner

FLOW RATE CONTROL VALVE

CROSS-REFERENCE TO RELATED APPLICATIONS

This is a US national phase application based on the PCT International Patent Application No. PCT/JP2021/020811 filed on Jun. 1, 2021, and claiming the priority to Japanese Patent Application No. 2020-158532 filed on Sep. 23, 2020, the entire contents of which are incorporated by reference herein.

TECHNICAL FIELD

The present disclosure relates to a flow rate control valve to be used for regulating a flow rate of a fluid.

BACKGROUND ART

Patent Document 1 discloses a flow rate control valve (a sealing valve) for opening and closing a gas flow passage, in which a seal part (a sealing member) is provided between a valve seat and a valve element.

RELATED ART DOCUMENTS

Patent Documents

Patent Document 1: JP2019-029129 A

SUMMARY OF INVENTION

Problems to be Solved by the Invention

In the flow rate control valve disclosed in Patent Document 1, the valve seat and the valve element are accommodated in a body (a housing), and the valve seat is placed in a stepped portion of a pipe part which is a part of the body. However, there is no mention about a method for sealing between the valve seat and the body (concretely, the stepped portion). It is therefore conceivable to additionally provide a member for sealing between the valve seat and the body. This configuration however results in an increase in the number of parts, which may lead to an increase in the size of the flow rate control valve.

The present disclosure has been made to address the above problems and has a purpose to provide a flow rate control valve reduced in size.

Means of Solving the Problems

To achieve the above-mentioned purpose, one aspect of the present disclosure provides a flow rate control valve comprising: an annular valve seat; a valve element that contacts with and separates from the valve seat; and a body accommodating the valve seat and the valve element, wherein the valve seat includes: an annular valve-seat base part; and an annular valve-seat seal part provided on an inner periphery side of the valve-seat base part, the body includes: a body contact surface with which an end of the valve-seat base part on one side in an axial direction of the valve-seat base part is in contact; and a body press-fit surface against which an outer peripheral surface of the valve-seat base part is press-fitted, and the valve-seat seal part includes: a seat surface provided at an end on an opposite side to a side of the body contact surface in an axial direction of the valve-seat seal part, the seat surface being configured to contact with the valve element to seal between the valve seat and the valve element when the flow rate control valve is in a valve closed state; and a valve-seat-to-body sealing portion provided at an end on the side of the body contact surface in the axial direction of the valve-seat seal part, the valve-seat-to-body sealing portion protruding toward the body contact surface more than the valve-seat base part and being in contact with the body contact surface to seal between the valve seat and the body.

According to the above configuration, sealing at two locations, one between the valve seat and the valve element and the other between the valve seat and the body, can be achieved by a single valve-seat seal part. Thus, the flow rate control valve can be provided with the reduced number of parts and the reduced size.

In the above-described configuration, the valve-seat base part includes: at an end on the side of the body contact surface in the axial direction of the valve-seat base part, a contact surface-side end face; and a base protruding portion protruding more than the contact surface-side end face toward the body contact surface.

According to the above configuration, a leading end face of the base protruding portion is placed in contact with the body contact surface when the valve seat is press-fitted in the body. The valve seat can thus be held against further movement. Accordingly, the base protruding portion can function as a stopper for the valve seat when press-fitted into the body.

In the above-described configuration, the valve-seat-to-body sealing portion sealing between the valve seat and the body is formed protruding toward the body contact surface more than the base protruding portion while the valve-seat-to-body sealing portion is out of contact with the body contact surface.

According to the above configuration, when the valve seat is press-fitted in the body and the leading end face of the base protruding portion contacts with the contact surface, the valve-seat-to-body sealing portion can be contacted, in a compressed state, with the contact surface. Accordingly, while the base protruding portion functions as a stopper for the valve seat when press-fitted into the body, the valve-seat-to-body sealing portion can reliably seal between the valve seat and the body.

In the above-described configuration, the valve-seat base part includes a multistage inclined portion in an outer peripheral surface of the valve-seat base part at the end on the side of the body contact surface, the multistage inclined portion being inclined in multiple stages from the outer peripheral surface of the valve-seat base part toward the inner periphery side of the valve-seat base part.

According to the above configuration, when the valve seat is press-fitted into the body, the multistage inclined portion of the valve-seat base part can be spaced apart from a corner formed by the contact surface and the press-fit surface of the body. Thus, the valve-seat base part is less likely to interfere with the corner between the contact surface and the press-fit surface of the body.

In the above-described configuration, the body includes: at a position upstream of the body press-fit surface in a press-fit direction of the valve seat, a shoulder portion formed in a surface facing to the outer peripheral surface of the valve-seat base part and located at a position more outside than the body press-fit surface in a radial direction of the valve-seat base part; and a sloping portion inclined from the shoulder portion to the body press-fit surface.

According to the above configuration, the valve seat is easily press-fitted in the body.

In the above-described configuration, the flow rate control valve is used in a fuel cell system, and the valve seat is press-fitted in the body toward a side where a fuel cell is disposed.

According to the above configuration, even when a fuel cell is under a negative pressure, the valve seat is drawn in the direction of press-fit in the body and thus is less likely to separate from the body.

Effects of the Invention

The flow rate control valve of the present disclosure can achieve reduction in size.

MODE FOR CARRYING OUT THE INVENTION

A detailed description of an embodiment of a flow rate control valve of this disclosure will now be given referring to the accompanying drawings. A flow rate control valve 1 of the present embodiment will be described below after descriptions of a fuel cell system 101 for which the flow rate control valve 1 is used.
<Description of Fuel Cell System>

Figure 1:
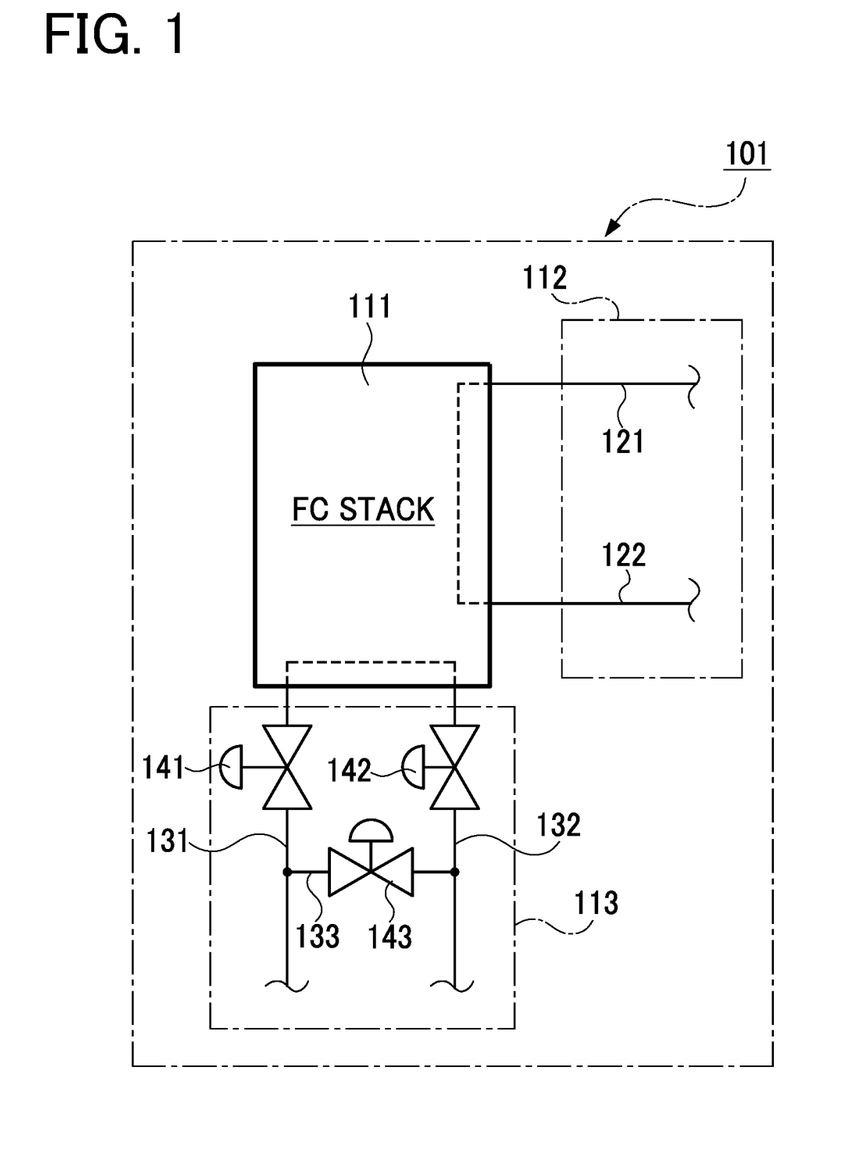
FIG. 1 is a schematic configuration diagram of a fuel cell system for which a flow rate control valve of a present embodiment is used.

The fuel cell system 101 includes, as shown in FIG. 1, a fuel cell stack (fuel cells, or a FC stack) 111, a hydrogen-related system 112, and an air-related system 113.

When supplied with fuel gas and oxidant gas, the fuel cell stack 111 generates electricity. In the present embodiment, the fuel gas is a hydrogen gas and the oxidant gas is air. Specifically, the fuel cell stack 111 generates electricity by receiving the hydrogen gas supplied from the hydrogen-related system 112 and the air supplied from the air-related system 113. This electric power generated by the fuel cell stack 111 is supplied to, for example, a drive motor (not shown) through an inverter (not shown).

The hydrogen-related system 112 is placed on an anode side of the fuel cell stack 111. This hydrogen-related system 112 is provided with a hydrogen supply passage 121 and a hydrogen exhaust passage 122. The hydrogen supply passage 121 is a passageway for supplying hydrogen gas from a hydrogen tank (not shown) to the fuel cell stack 111. The hydrogen exhaust passage 122 is a passageway for exhausting the hydrogen gas discharged from the fuel cell stack 111, which will be hereinafter appropriately referred to as hydrogen off-gas.

The air-related system 113 is placed on a cathode side of the fuel cell stack 111. This air-related system 113 is provided with an air supply passage 131, an air exhaust passage 132, and a bypass passage 133. The air supply passage 131 is a flow channel for flowing air, serving as a passageway for supplying the air from the outside of the fuel cell system 101 to the fuel cell stack 111. The air exhaust passage 132 is a flow channel for flowing air, serving as a passageway for exhausting the air discharged from the fuel cell stack 111, which is hereinafter appropriately referred to as air off-gas. The bypass passage 133 is a passageway for allowing air to flow from the air supply passage 131 to the air exhaust passage 132 without passing through the fuel cell stack 111.

The air-related system 113 is provided with an inlet sealing valve 141 in the air supply passage 131. This inlet sealing valve 141 is a valve for opening and closing the air supply passage 131 to switch between supply and shutoff of air to the fuel cell stack 111. In the present embodiment, the flow rate control valve 1 described later is used as the inlet sealing valve 141.

The air-related system 113 is further provided with an outlet sealing valve 142 in the air exhaust passage 132. This outlet sealing valve 142 is a valve for opening and closing the air exhaust passage 132 to switch between exhaust and shutoff of air off-gas from the fuel cell stack 111. In the present embodiment, the flow rate control valve 1 described later is used as the outlet sealing valve 142.

The air-related system 113 is further provided with a bypass valve 143 in the bypass passage 133. The bypass valve 143 is a valve for controlling a flow rate of air in the bypass passage 133. The flow rate control valve 1 described later may be used as the bypass valve 143.

In the fuel cell system 101 configured as above, the hydrogen gas supplied from the hydrogen supply passage 121 to the fuel cell stack 111 is used to generate electricity in the fuel cell stack 111. The hydrogen gas is thereafter exhausted as hydrogen off-gas from the fuel cell stack 111 to the outside of the fuel cell system 101 through the hydrogen exhaust passage 122. The air supplied to the fuel cell stack 111 through the air supply passage 131 is used to generate electricity in the fuel cell stack 111, and then exhausted as air off-gas from the fuel cell stack 111 to the outside of the fuel cell system 101 through the air exhaust passage 132.
<Description of Flow Rate Control Valve>

The flow rate control valve 1 will be described below, which is used as each of the inlet sealing valve 141, the outlet sealing valve 142, and the bypass valve 143 in the fuel cell stack 111.
(Overview of the Flow Rate Control Valve)

Figure 2:
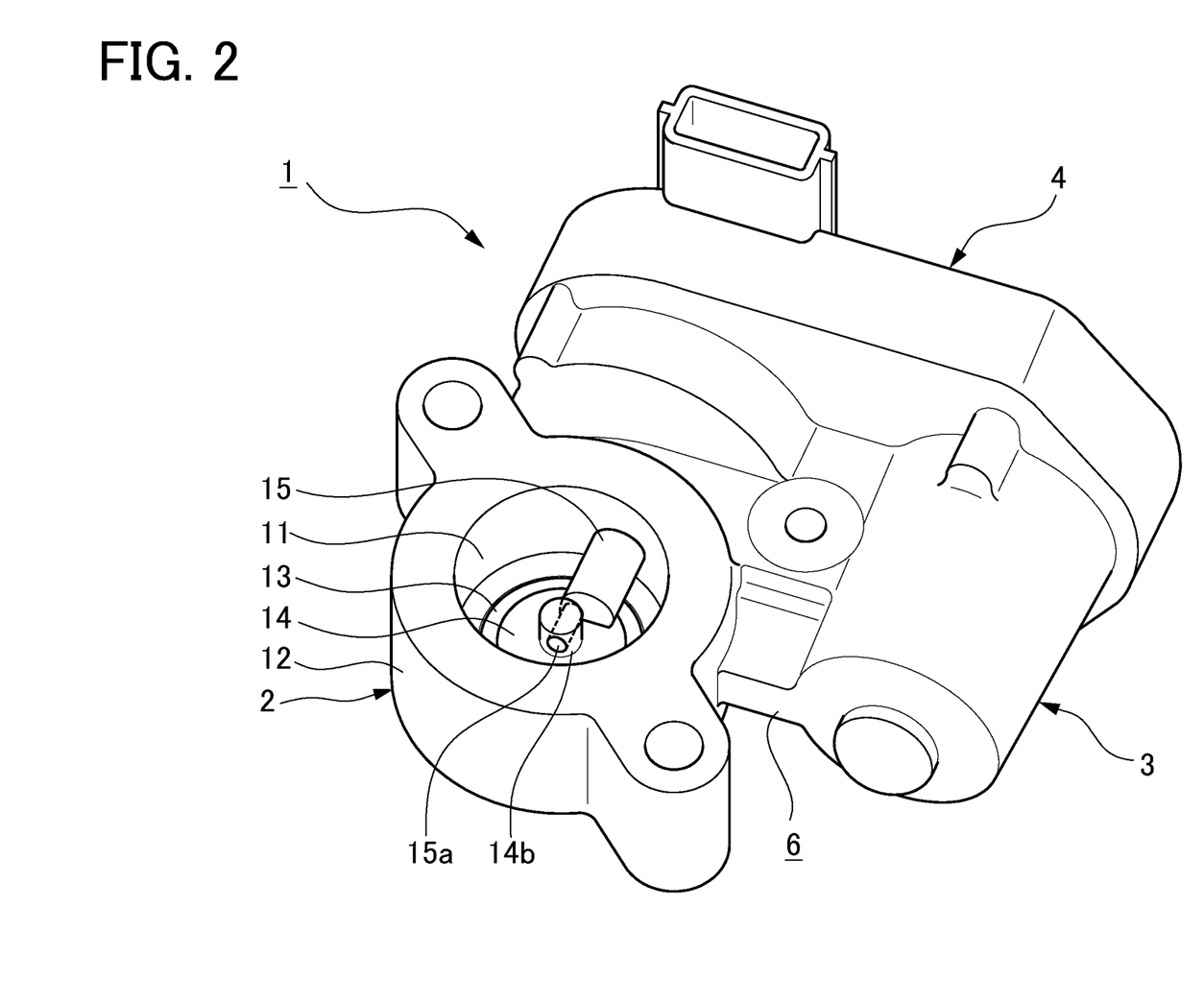
FIG. 2 is a perspective view of the flow rate control valve of the present embodiment.

The overview of the flow rate control valve 1 will be given first. As shown in FIG. 2, the flow rate control valve 1 is provided with a valve section 2 constituted of a double eccentric valve, a motor section 3 internally containing a motor, and a speed-reducing mechanism 4 internally containing a plurality of gears. The valve section 2 includes a metallic pipe part 12 internally having a flow passage 11 for flowing a fluid. In the flow passage 11, a valve seat 13, a valve element 14, and a rotary shaft 15 are placed. The inner shape of the flow passage 11, the outer shape of the valve seat 13, and the outer shape of the valve element 14 are each circular or nearly circular in plan view. The rotary shaft 15 receives a rotary power of the motor through the plurality of gears. In the present embodiment, the pipe part 12 with the flow passage 11 corresponds to a part of a housing 6. The motor of the motor section 3 and the plurality of gears of the speed-reducing mechanism 4 are covered with the housing 6. This housing 6 is a body accommodating the valve seat 13, the valve element 14, and others. The housing 6 is made of metal, such as aluminum.

Figure 3:
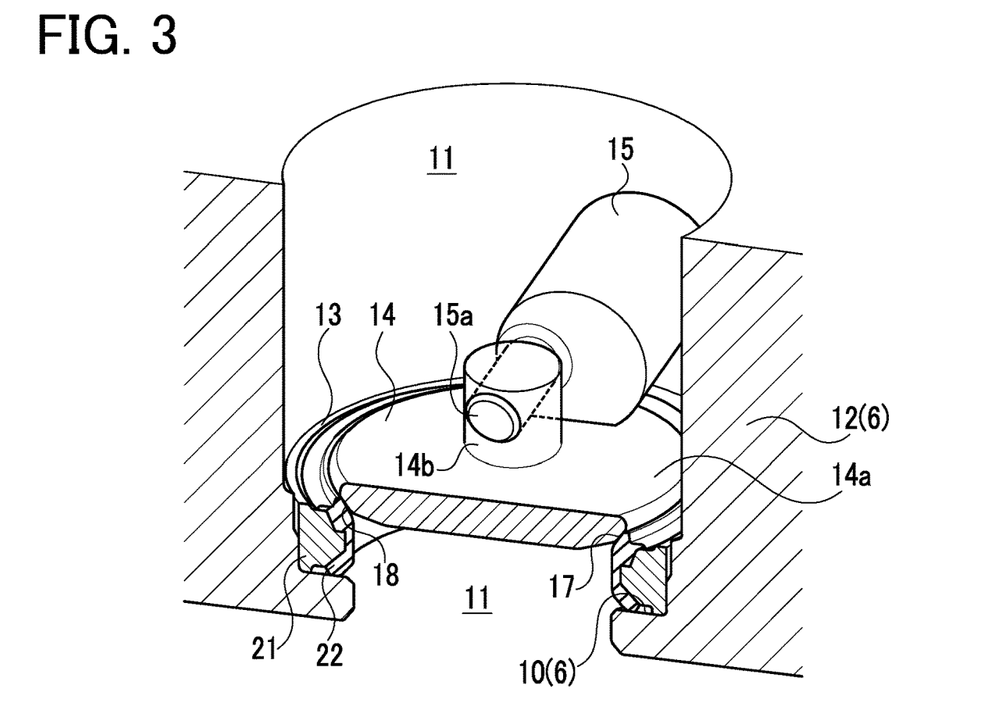
FIG. 3 is a perspective view of a valve section in a valve closed state (a fully closed state) including a partially cutaway view.
Figure 4:
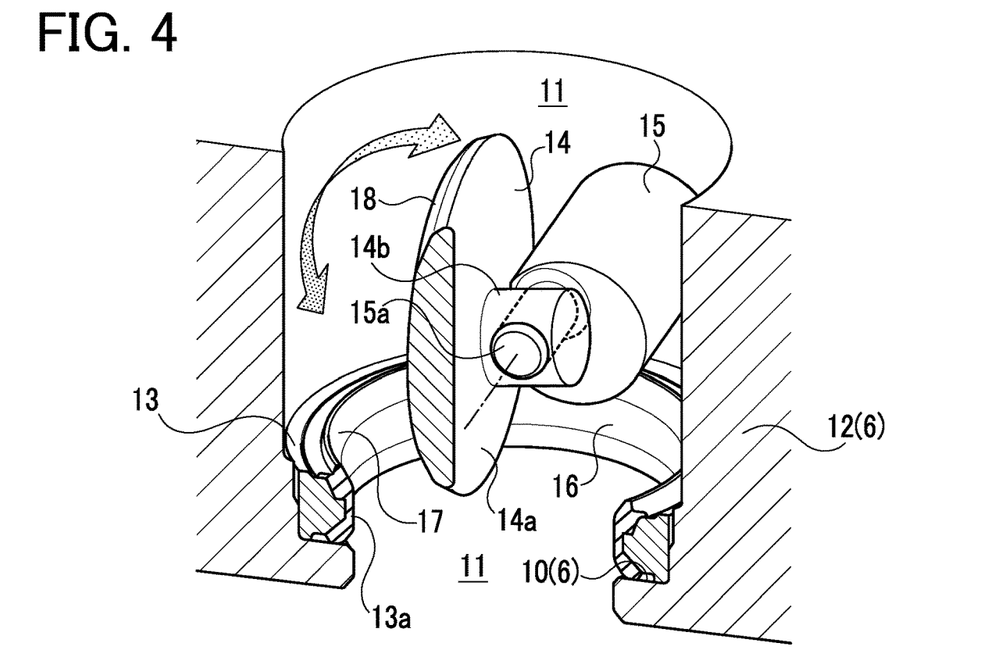
FIG. 4 is a perspective view of the valve section in a valve open state (a fully open state) including a partially cutaway view.

As shown in FIGS. 3 and 4, the pipe part 12, which is a part of the housing 6, is formed with a stepped portion 10, in which the valve seat 13 is assembled. In the present embodiment, the valve seat 13 is press-fitted, or fixed, in the stepped portion 10 of the housing 6. The valve seat 13 is annular in shape and has a circular or nearly circular valve hole 16 at the center. The valve hole 16 is provided, along its edge, with an annular seat surface 17. In the present embodiment, the valve seat 13 is provided with a rubber seal part 22 (one example of a seal part of the present disclosure) to seal between the valve seat 13 and the valve element 14. This rubber seal part 22 includes the seat surface 17. The details of the valve seat 13 will be described later.

The valve element 14 has a circular disk shape whose outer periphery is formed with an annular sealing surface 18 which faces the seat surface 17. The valve element 14 is fixed to the rotary shaft 15 and integrally rotates with the rotary shaft 15 to contact with and separate from the valve seat 13.

Figure 6:
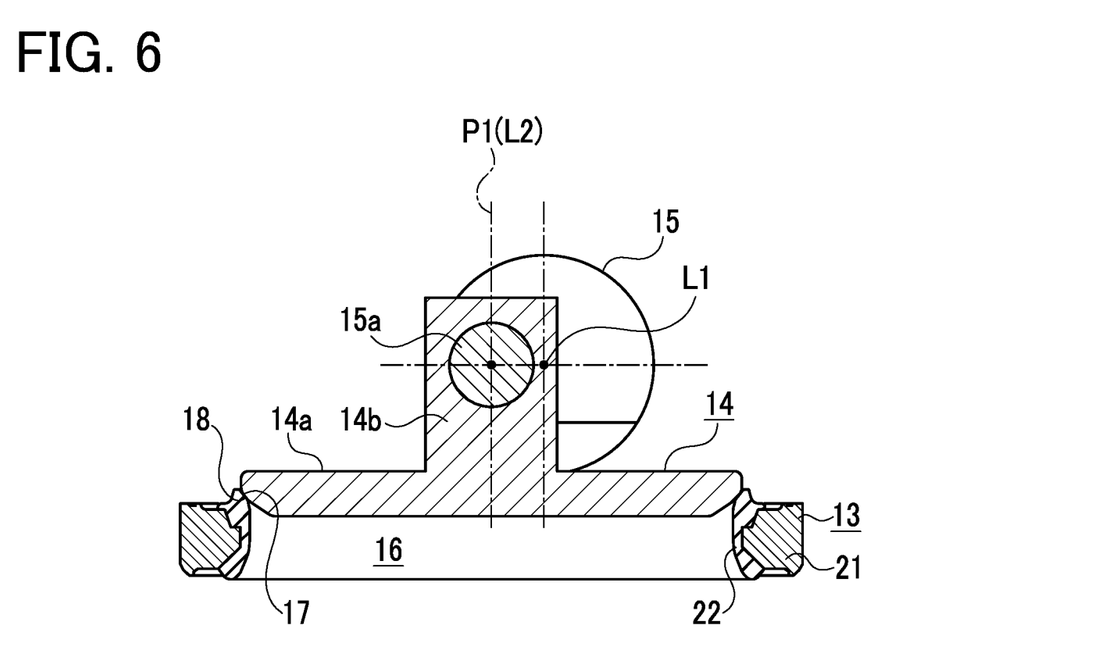
FIG. 6 is a cross-sectional view taken along A-A in FIG. 5.

As shown in FIG. 6, the axis L1 of the rotary shaft 15 extends parallel to the radial direction of the valve element 14 and the valve hole 16 and is positioned eccentrically from the center P1 of the valve hole 16 to the radial direction of the valve hole 16. Further, the sealing surface 18 of the valve element 14 is positioned eccentrically from the axis L1 of the rotary shaft 15 to an extending direction of the axis L2 of the valve element 14.

Figure 5:
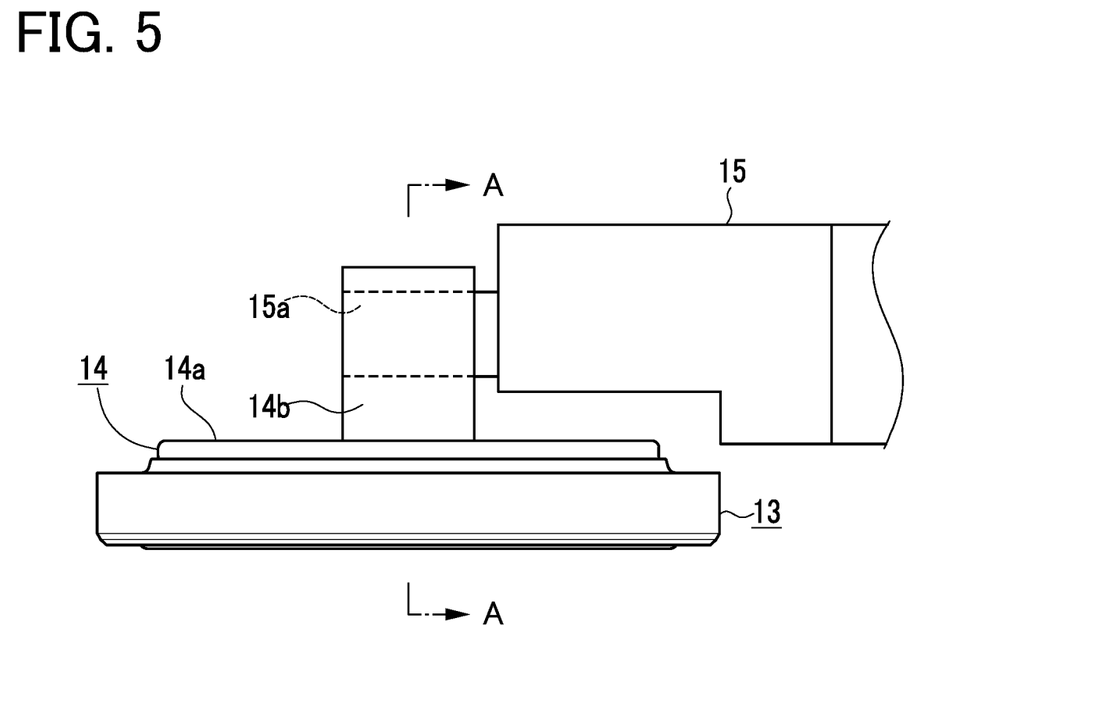
FIG. 5 is a side view of a valve seat, a valve element, and a rotary shaft in the valve closed state.

As shown in FIGS. 5 and 6, the valve element 14 includes a fixed portion 14b having a mountain-like shape that protrudes from a plate surface 14a on an upper side of the valve element 14 and is fixed to the rotary shaft 15. This fixed portion 14b is fixed to the rotary shaft 15 through a pin 15a protruding from a distal end of the rotary shaft 15 and at a position displaced in the radial direction of the rotary shaft 15 from the axis L1 of the rotary shaft 15. As shown in FIG. 6, the fixed portion 14b is placed on the axis L2 of the valve element 14 and the valve element 14 including the fixed portion 14b has a bilaterally symmetrical shape relative to the axis L2 of the valve element 14.

In the flow rate control valve 1 configured as above, when the valve element 14 is rotated about the axis L1 of the rotary shaft 15, the valve element 14 comes to a valve closed state in which the sealing surface 18 of the valve element 14 contacts with the seat surface 17 of the valve seat 13, corresponding to a fully closed state (see FIG. 3), or alternatively comes to a valve open state in which the sealing surface 18 of the valve element 14 separates from the seat surface 17 of the valve seat 13. Concretely, the valve open state shown in FIG. 4 is a fully open state in which the sealing surface 18 of the valve element 14 is furthest away from the seat surface 17.

(Valve Seat and its Surroundings)

The following description is given to the structures and operations of the valve seat 13 and its surroundings.

Figure 7:
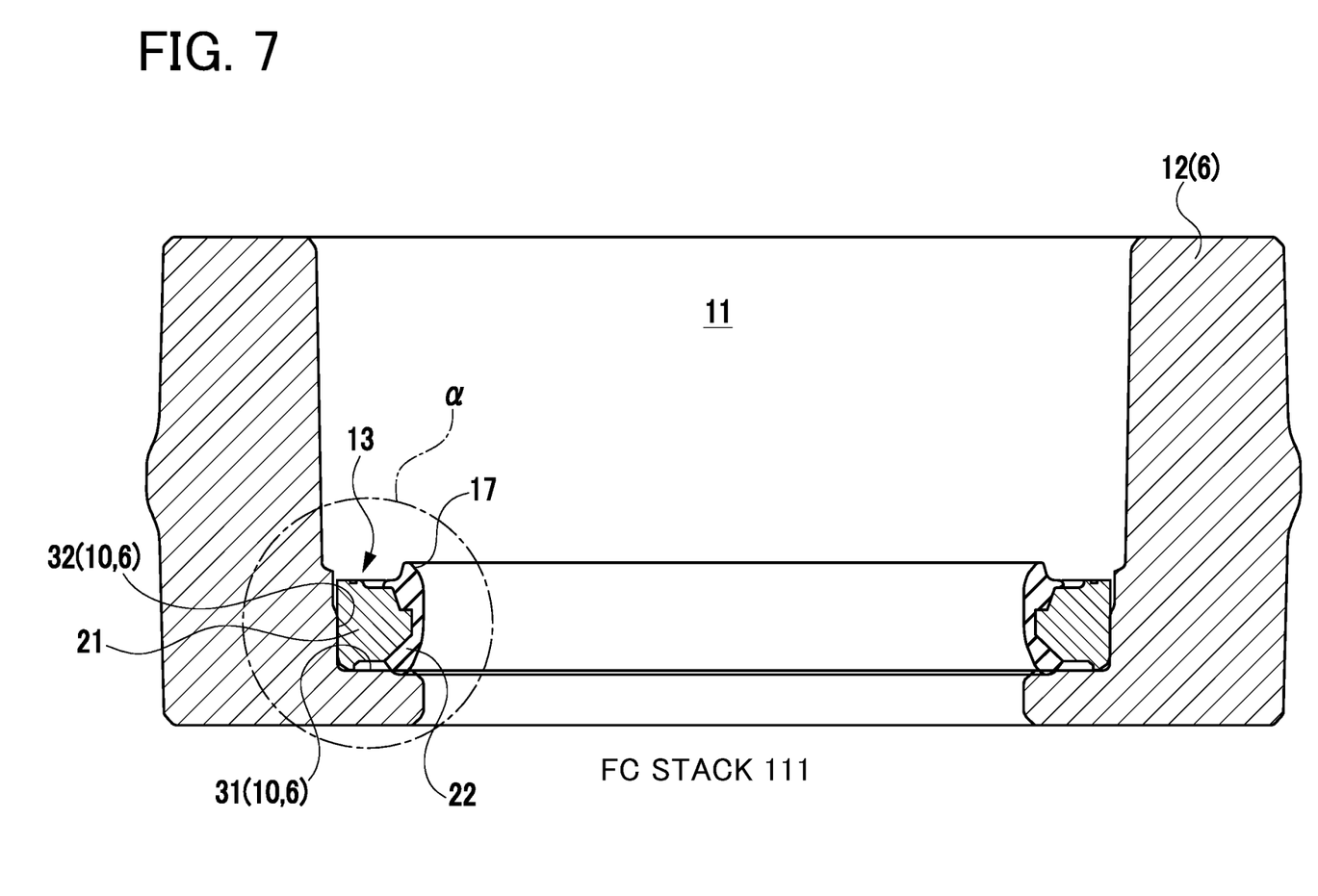
FIG. 7 is a cross-sectional view of the valve seat and its surrounding in the present embodiment, which is a cross-sectional view cut along an axial direction of the valve seat.
Figure 8:
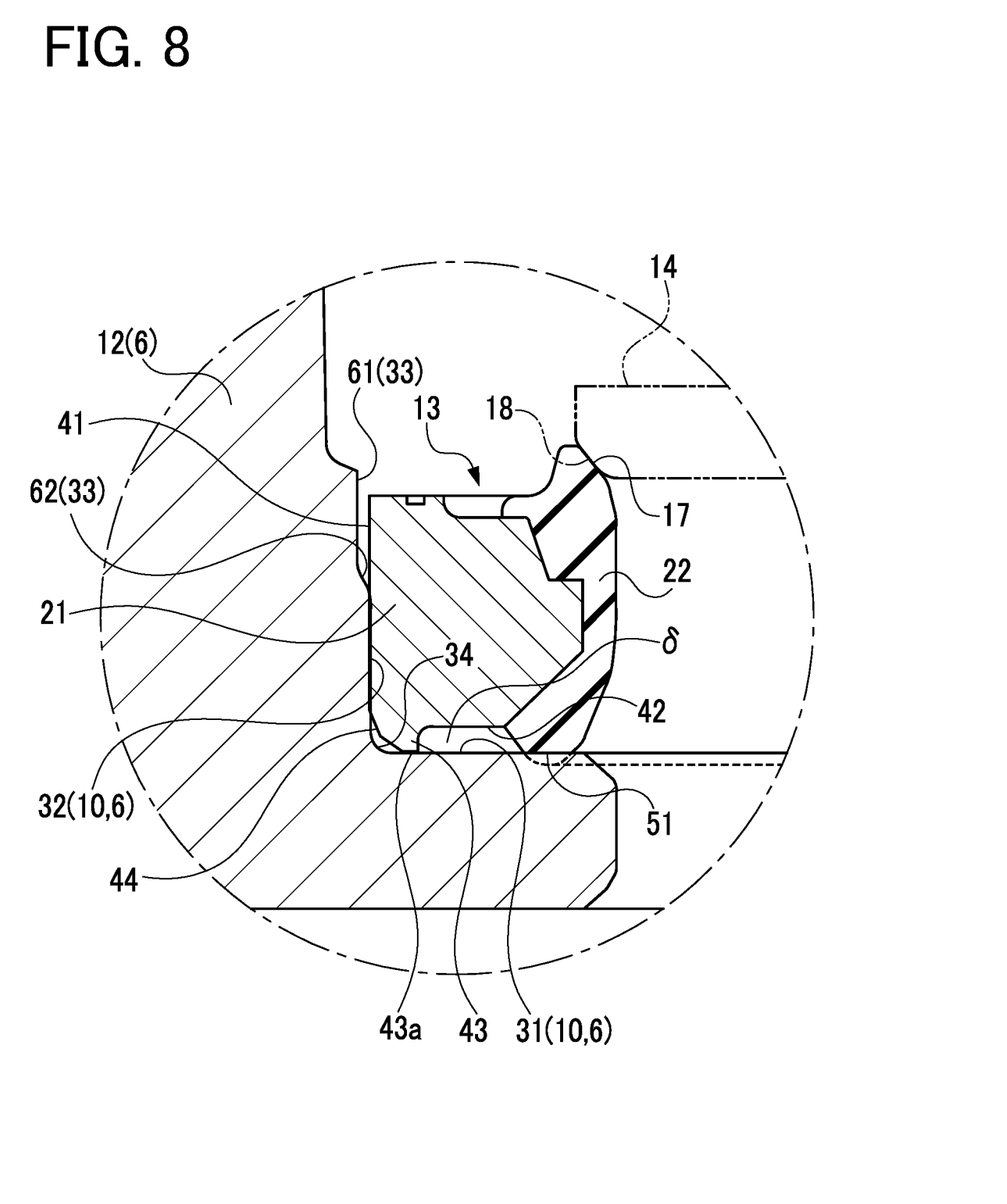
FIG. 8 is an enlarged view of a region a in FIG. 7.
Figure 9:
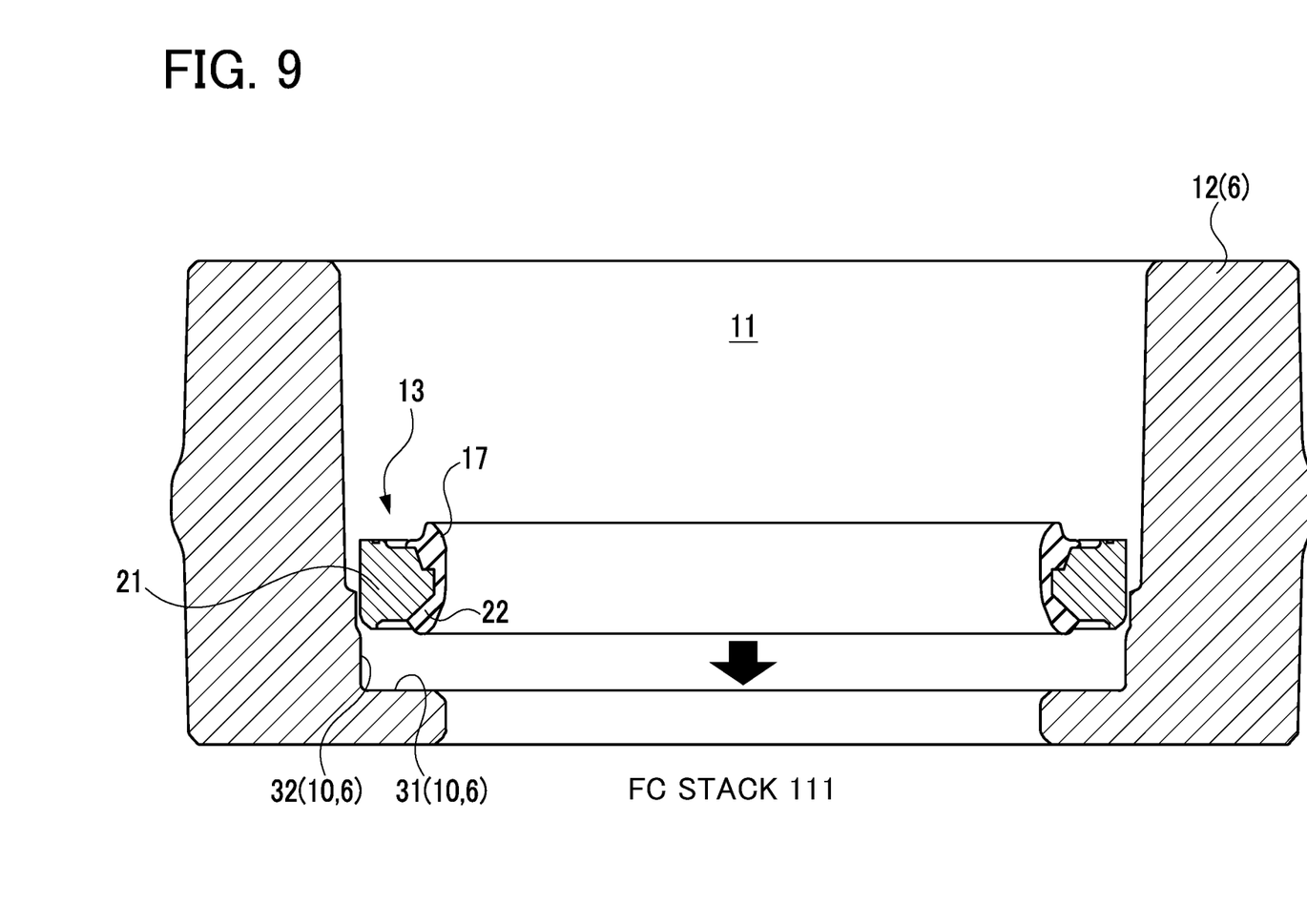
FIG. 9 is a cross-sectional view of the valve seat and its surrounding in the present embodiment, which is a cross-sectional view cut along the axial direction of the valve seat, and a diagram showing that the valve seat is in a state just before being press-fitted in a housing.

As shown in FIGS. 7 and 8, the valve seat 13 is press-fitted in the housing 6, concretely, in the stepped portion 10 of the pipe part 12 which is a part of the housing 6. In the present embodiment, the fuel cell stack 111 is placed below the valve seat 13 in FIGS. 7 and 8. As shown in FIG. 9, the valve seat 13 is press-fitted into the housing 6 toward the side on which the fuel cell stack 111 is placed. In FIGS. 7 and 9, the valve element 14 and the rotary shaft 15 are omitted for convenience.

The valve seat 13 is provided with a valve-seat base part 21 and a rubber seal part 22 placed on the inner periphery of the valve-seat base part 21. These valve-seat base part 21 and rubber seal part 22 are each of an annular shape, concretely, a circular-ring shape or a nearly circular-ring shape. The rubber seal part 22 is one example of a valve-seat seal part of the present disclosure. The valve-seat base part 21 is made of metal, such as stainless steel, and the rubber seal part 22 is made of rubber.

The housing 6 includes, in its stepped portion 10, a contact surface 31 and a press-fit surface 32. The contact surface 31 is a surface with which the end of the valve-seat base part 21 on one side (a lower side) in the axial direction of the valve-seat base part 21 (a vertical direction in FIGS. 7 and 8) is in contact. The press-fit surface 32 is a surface against which an outer peripheral surface 41 of the valve-seat base part 21 is press-fitted. The contact surface 31 is one example of a body contact surface of the present disclosure. The press-fit surface 32 is one example of a body press-fit surface of the present disclosure.

The press-fit surface 32 is hidden by the valve seat 13 over the entire circumference and thus is not exposed. It is therefore possible to suppress burrs and others generated when the valve seat 13 is press-fitted into the housing 6 from falling out or being ejected from press-fit portions of the outer peripheral surface 41 of the valve-seat base part 21 and the press-fit surface 32.

In the present embodiment, the rubber seal part 22 includes a valve-seat-to-housing sealing portion 51, which will be simply referred to as a sealing portion 51, in addition to the seat surface 17. The sealing portion 51 is one example of a valve-seat-to-body sealing portion of the present disclosure.

Specifically, the seat surface 17 is located at an end of the rubber seal part 22 on the opposite side (the upper side) to the side of the contact surface 31 in the axial direction (the vertical direction in FIGS. 7 and 8). When the flow rate control valve 1 is in the valve closed state (see FIG. 3), the seat surface 17 is in contact with the sealing surface 18 of the valve element 14 and seals between the valve seat 13 and the valve element 14.

The sealing portion 51 is located at an end of the rubber seal part 22 on the side (the lower side) of the contact surface 31 in the axial direction, the sealing portion 51 protruding toward the contact surface 31 more than a contact-surface-side end face 42 of the later-mentioned valve-seat base part 21 on the side facing the contact surface 31. The sealing portion 51 is in contact with the contact surface 31 to seal between the valve seat 13 and the housing 6, concretely, between the rubber seal part 22 and the contact surface 31. This sealing portion 51 protrudes toward the contact surface 31 more than a base protruding portion 43 of the later-described valve-seat base part 21 while the sealing portion 51 is out of contact with the contact surface 31, that is, before the valve seat 13 is press-fitted into the stepped portion 10 of the housing 6, as shown in FIGS. 8 and 9.

Furthermore, as shown in FIGS. 7 and 8, the valve-seat base part 21 includes the contact-surface-side end face 42 and the base protruding portion 43 at the end on the side of the contact surface 31 in the axial direction of the valve-seat base part 21. The contact-surface-side end face 42 is an end face located on the side facing the contact surface 31 in the axial direction of the valve-seat base part 21. The base protruding portion 43 protrudes more than the contact-surface-side end face 42 toward the contact surface 31. A leading end face 43a of this base protruding portion 43 is in contact with the contact surface 31.

The valve-seat base part 21 includes a two-stage inclined portion 44 in the outer peripheral surface 41 of the valve-seat base part 21 at an end on the side of the contact surface 31. This two-stage inclined portion 44 is inclined in two stages from the outer peripheral surface 41 toward the inner periphery side of the valve-seat base part 21 (rightward in FIG. 8). Instead of the two-stage inclined portion 44, an inclined portion that is inclined in three or more stages may be adopted. Specifically, the valve-seat base part 21 has only to include a multistage inclined portion that is inclined in a multiple stage, i.e., two or more stages, from the outer peripheral surface 41 toward the inner peripheral side of the valve-seat base part 21.

As shown in FIG. 8, the stepped portion 10 of the housing 6 includes a press-fit guide part 33 located at a position upstream of (i.e., above in FIG. 8) the press-fit surface 32 in a press-fitting direction of the valve seat 13. The press-fit guide part 33 is configured to guide the valve seat 13 when the valve seat 13 is to be press-fitted into the stepped portion 10.

This press-fit guide part 33 includes a shoulder portion 61 and a sloping portion 62. The shoulder portion 61 is formed in the surface facing the outer peripheral surface 41 of the valve-seat base part 21 and located at a position more outside than the press-fit surface 32 in the radial direction of the valve-seat base part 21 (to the left in FIG. 8). The sloping portion 62 is inclined from the shoulder portion 61 to the press-fit surface 32.

Furthermore, the press-fit length of the outer peripheral surface 41 of the valve-seat base part 21 (against the press-fit surface 32) is set to a length that enables application of a load for retaining press-fit against the repulsive force of the sealing portion 51 that seals between the valve seat 13 and the housing 6.

A gap between the press-fit guide part 33 and the outer peripheral surface 41 of the valve-seat base part 21 is set at a distance not causing foreign substances from the outside to be caught in that gap, so that no foreign substances larger than the gap will remain in the gap. Thus, the flow rate control valve 1 is easy to clean.

Operations and Advantages of the Present Embodiment

According to the present embodiment, as described above, the rubber seal part 22 of the valve seat 13 includes the seat surface 17 and the sealing portion 51.

Specifically, the rubber seal part 22 includes the seat surface 17 that contacts with the valve element 14 to seal between the valve seat 13 and the valve element 14 while the flow rate control valve 1 is in the valve closed state and also the sealing portion 51 that contacts with the contact surface 31 to seal between the valve seat 13 and the housing 6. Accordingly, with a single rubber seal part 22, sealing can be achieved at two positions: between the valve seat 13 and the valve element 14 and between the valve seat 13 and the housing 6. Thus, the flow rate control valve 1 can be provided with the reduced number of parts and the reduced size.

The valve-seat base part 21 of the valve seat 13 also includes the base protruding portion 43.

Specifically, the base protruding portion 43 is located at the end of the valve-seat base part 21 on the side of the contact surface 31. Accordingly, when the valve seat 13 is press-fitted into the stepped portion 10, the leading end face 43a of the base protruding portion 43 comes into contact with the contact surface 31, so that the valve seat 13 can be stopped to avoid further movement. Therefore, the base protruding portion 43 can serve as a stopper for the valve seat 13 when press-fitted into the stepped portion 10.

Since the base protruding portion 43 is placed at a position close to the outer peripheral surface 41 of the valve-seat base part 21, the outer peripheral surface 41 of the valve-seat base part 21 can have a necessary press-fit length because the press-fit length can be made longer just by the length of the two-stage inclined portion 44 formed in the base protruding portion 43.

Furthermore, the base protruding portion 43 is located with a space δ from the sealing portion 51 of the rubber seal part 22.

Thus, burrs and others generated when the valve seat 13 is press-fitted into the stepped portion 10 are allowed to collect in the space δ, thereby avoiding entrance of the burrs and others in the interface between the valve-seat base part 21 and the rubber seal part 22.

When the valve seat 13 is press-fitted into the stepped portion 10, and the sealing portion 51 made of rubber is contacted, under compression, with the contact surface 31, a part of the sealing portion 51 can enter the space S. A part of the sealing portion 51 is thus less likely to enter the valve hole 16 located on the inner periphery side of the rubber seal part 22 and therefore is unlikely to affect the passage diameter of the valve hole 16. Consequently, a flow rate of a fluid to be controlled by the flow rate control valve 1 is less likely to be affected.

When the sealing portion 51 is out of contact with the contact surface 31, the sealing portion 51 protrudes toward the contact surface 31 more than the base protruding portion 43.

Accordingly, the sealing portion 51 in a state before contacting with the contact surface 31 protrudes toward the contact surface 31 more than the base protruding portion 43. Thus, when the valve seat 13 is press-fitted into the stepped portion 10 and the leading end face 43a of the base protruding portion 43 abuts against the contact surface 31, the sealing portion 51 can be contacted, under compression, with the contact surface 31. Consequently, the sealing portion 51 can reliably seal between the valve seat 13 and the housing 6, even though the base protruding portion 43 serves as a stopper for the valve seat 13 at the time of press-fitting into the stepped portion 10.

The valve-seat base part 21 includes the two-stage inclined portion 44.

The corner of the valve-seat base part 21 at an end of the outer peripheral surface 41 on the side of the contact surface 31 is inclined as above in two stages toward the inner periphery side, as the two-stage inclined portion 44, not as a sharp corner. Accordingly, when the valve seat 13 is press-fitted into the stepped portion 10, the two-stage inclined portion 44 of the valve-seat base part 21 can be spaced apart from a round shaped portion (that is, a curved portion) or a C shaped portion (that is, a linearly slanted portion, such as a chamfered portion) at a corner 34 formed by the contact surface 31 and the press-fit surface 32 of the stepped portion which intersect with each other. Thus, the valve-seat base part 21 is less likely to interfere with the corner 34 of the stepped portion 10.

If the corner of the valve-seat base part 21 at the end of the outer peripheral surface 41 on the side of the contact surface 31 is formed as a single-stage inclined portion that is inclined or beveled with a one-stage shape, it may cause a decrease in the press-fit length of the outer peripheral surface 41 of the valve-seat base part 21. In contrast, in the present embodiment, it is formed as the two-stage inclined portion 44 that is inclined or beveled with a two-stage shape, which can provide a sufficient press-fit length of the outer peripheral surface 41 of the valve-seat base part 21.

The housing 6 includes, in its stepped portion 10, the press-fit guide portion 33 provided with the shoulder portion 61 and the sloping portion 62.

Accordingly, when the valve seat 13 is press-fitted against the press-fit surface 32 of the stepped portion 10, the valve seat 13 can be press-fitted against the press-fit surface 32 by passing through the inside of the shoulder portion 61 and being guided along the sloping portion 62. This can facilitate press-fitting of the valve seat 13 against the press-fit surface 32.

Further, the valve seat 13 is press-fitted into the stepped portion 10 of the housing 6 toward the side on which the fuel cell stack 111 is placed.

Thus, the valve seat 13 is drawn in a direction of press-fitting into the stepped portion 10 even when the fuel cell stack 111 is under negative pressure, the valve seat 13 is less likely to separate from the stepped portion 10.

The foregoing embodiments are mere examples and give no limitation to the present disclosure. The present disclosure may be embodied in other specific forms without departing from the essential characteristics thereof.

For example, the multistage inclined portion may have a round shape.

REFERENCE SIGNS LIST

1 Flow rate control valve
2 Valve section
6 Housing
10 Stepped portion
12 Pipe part
13 Valve seat
14 Valve element
15 Rotary shaft
16 Valve hole
17 Seat surface
18 Seal surface
21 Valve-seat base part
22 Rubber seal part
31 Contact surface
32 Press-fit surface
33 Press-fit guide part
34 Corner
41 Outer peripheral surface
42 Contact-surface-side end face
43 Base protruding portion
43*a* Leading end face
44 Two-stage inclined portion
51 Sealing portion (Valve-seat-to-housing sealing portion)
61 Shoulder portion
62 Sloping portion
101 Fuel cell system
111 Fuel cell stack
112 Hydrogen-related system
113 Air-related system
131 Air supply passage
132 Air exhaust passage
133 Bypass passage
141 Inlet sealing valve
142 Outlet sealing valve
143 Bypass valve
δ Space

The invention claimed is:

1. A flow rate control valve comprising:
an annular valve seat;
a valve element that contacts with and separates from the valve seat; and
a body accommodating the valve seat and the valve element,
wherein the valve seat includes:
an annular valve-seat base part; and
an annular valve-seat seal part provided on an inner periphery side of the valve-seat base part,
the body includes:
a body contact surface with which an end of the valve-seat base part on one side in an axial direction of the valve-seat base part is in contact; and
a body press-fit surface against which an outer peripheral surface of the valve-seat base part is press-fitted,
the valve-seat seal part includes:
a seat surface provided at an end on an opposite side to a side of the body contact surface in an axial direction of the valve-seat seal part, the seat surface being configured to contact with the valve element to seal between the valve seat and the valve element when the flow rate control valve is in a valve closed state; and
a valve-seat-to-body sealing portion provided at an end on the side of the body contact surface in the axial direction of the valve-seat seal part, the valve-seat-to-body sealing portion protruding toward the body contact surface more than the valve-seat base part and being in contact with the body contact surface to seal between the valve seat and the body, and
the valve-seat base part includes:
at an end on the side of the body contact surface in the axial direction of the valve-seat base part,
a contact surface-side end face; and
a base protruding portion protruding more than the contact surface-side end face toward the body contact surface.

2. The flow rate control valve according to claim 1, wherein
the flow rate control valve is used in a fuel cell system, and
the valve seat is press-fitted in the body toward a side where a fuel cell is disposed.

3. The flow rate control valve according to claim 1, wherein
the body includes:
at a position upstream of the body press-fit surface in a press-fit direction of the valve seat,
a shoulder portion formed in a surface facing to the outer peripheral surface of the valve-seat base part and located at a position more outside than the body press-fit surface in a radial direction of the valve-seat base part; and
a sloping portion inclined from the shoulder portion to the body press-fit surface.

4. The flow rate control valve according to claim 3, wherein
the flow rate control valve is used in a fuel cell system, and
the valve seat is press-fitted in the body toward a side where a fuel cell is disposed.

5. The flow rate control valve according to claim 1, wherein the valve-seat base part includes a multistage inclined portion in an outer peripheral surface of the valve-seat base part at the end on the side of the body contact surface, the multistage inclined portion being inclined in multiple stages from the outer peripheral surface of the valve-seat base part toward the inner periphery side of the valve-seat base part.

6. The flow rate control valve according to claim 5, wherein
the body includes:
at a position upstream of the body press-fit surface in a press-fit direction of the valve seat,
a shoulder portion formed in a surface facing to the outer peripheral surface of the valve-seat base part and located at a position more outside than the body press-fit surface in a radial direction of the valve-seat base part; and
a sloping portion inclined from the shoulder portion to the body press-fit surface.

7. The flow rate control valve according to claim 5, wherein
the flow rate control valve is used in a fuel cell system, and
the valve seat is press-fitted in the body toward a side where a fuel cell is disposed.

8. The flow rate control valve according to claim 1, wherein the valve-seat-to-body sealing portion sealing between the valve seat and the body is formed protruding toward the body contact surface more than the base protruding portion while the valve-seat-to-body sealing portion is out of contact with the body contact surface.

9. The flow rate control valve according to claim 8, wherein
the body includes:
at a position upstream of the body press-fit surface in a press-fit direction of the valve seat,
a shoulder portion formed in a surface facing to the outer peripheral surface of the valve-seat base part and located at a position more outside than the body press-fit surface in a radial direction of the valve-seat base part; and
a sloping portion inclined from the shoulder portion to the body press-fit surface.

10. The flow rate control valve according to claim 8, wherein
the flow rate control valve is used in a fuel cell system, and
the valve seat is press-fitted in the body toward a side where a fuel cell is disposed.

11. The flow rate control valve according to claim 8, wherein the valve-seat base part includes a multistage inclined portion in an outer peripheral surface of the valve-seat base part at the end on the side of the body contact surface, the multistage inclined portion being inclined in multiple stages from the outer peripheral surface of the valve-seat base part toward the inner periphery side of the valve-seat base part.

12. The flow rate control valve according to claim 11, wherein
the body includes:
at a position upstream of the body press-fit surface in a press-fit direction of the valve seat,
a shoulder portion formed in a surface facing to the outer peripheral surface of the valve-seat base part and located at a position more outside than the body press-fit surface in a radial direction of the valve-seat base part; and
a sloping portion inclined from the shoulder portion to the body press-fit surface.

13. The flow rate control valve according to claim 11, wherein
the flow rate control valve is used in a fuel cell system, and
the valve seat is press-fitted in the body toward a side where a fuel cell is disposed.

14. A flow rate control valve comprising:
an annular valve seat;
a valve element that contacts with and separates from the valve seat; and
a body accommodating the valve seat and the valve element,
wherein the valve seat includes:
an annular valve-seat base part; and
an annular valve-seat seal part provided on an inner periphery side of the valve-seat base part,
the body includes:
a body contact surface with which an end of the valve-seat base part on one side in an axial direction of the valve-seat base part is in contact; and
a body press-fit surface against which an outer peripheral surface of the valve-seat base part is press-fitted,
the valve-seat seal part includes:
a seat surface provided at an end on an opposite side to a side of the body contact surface in an axial direction of the valve-seat seal part, the seat surface being configured to contact with the valve element to seal between the valve seat and the valve element when the flow rate control valve is in a valve closed state; and
a valve-seat-to-body sealing portion provided at an end on the side of the body contact surface in the axial direction of the valve-seat seal part, the valve-seat-to-body sealing portion protruding toward the body contact surface more than the valve-seat base part and being in contact with the body contact surface to seal between the valve seat and the body, and
the valve-seat base part includes a multistage inclined portion in an outer peripheral surface of the valve-seat base part at the end on the side of the body contact surface, the multistage inclined portion being inclined in multiple stages from the outer peripheral surface of the valve-seat base part toward the inner periphery side of the valve-seat base part.

15. The flow rate control valve according to claim 14, wherein
the body includes:
at a position upstream of the body press-fit surface in a press-fit direction of the valve seat,
a shoulder portion formed in a surface facing to the outer peripheral surface of the valve-seat base part and located at a position more outside than the body press-fit surface in a radial direction of the valve-seat base part; and
a sloping portion inclined from the shoulder portion to the body press-fit surface.

16. The flow rate control valve according to claim 14, wherein
the flow rate control valve is used in a fuel cell system, and
the valve seat is press-fitted in the body toward a side where a fuel cell is disposed.

17. A flow rate control valve comprising:
an annular valve seat;
a valve element that contacts with and separates from the valve seat; and
a body accommodating the valve seat and the valve element,
wherein the valve seat includes:
an annular valve-seat base part; and
an annular valve-seat seal part provided on an inner periphery side of the valve-seat base part,
the body includes:
a body contact surface with which an end of the valve-seat base part on one side in an axial direction of the valve-seat base part is in contact; and
a body press-fit surface against which an outer peripheral surface of the valve-seat base part is press-fitted, and
the valve-seat seal part includes:
a seat surface provided at an end on an opposite side to a side of the body contact surface in an axial direction of the valve-seat seal part, the seat surface being configured to contact with the valve element to seal between the valve seat and the valve element when the flow rate control valve is in a valve closed state; and
a valve-seat-to-body sealing portion provided at an end on the side of the body contact surface in the axial direction of the valve-seat seal part, the valve-seat-to-body sealing portion protruding toward the body contact surface more than the valve-seat base part and being in contact with the body contact surface to seal between the valve seat and the body, and
the body further includes:
at a position upstream of the body press-fit surface in a press-fit direction of the valve seat,
a shoulder portion formed in a surface facing to the outer peripheral surface of the valve-seat base part and located at a position more outside than the body press-fit surface in a radial direction of the valve-seat base part; and
a sloping portion inclined from the shoulder portion to the body press-fit surface.

18. The flow rate control valve according to claim 17, wherein
the flow rate control valve is used in a fuel cell system, and
the valve seat is press-fitted in the body toward a side where a fuel cell is disposed.

* * * * *